US005459482A

United States Patent [19]
Orlen

[11] Patent Number: 5,459,482
[45] Date of Patent: Oct. 17, 1995

[54] FACSIMILE COMMUNICATION WITH AN ACTIVE ADDRESSING DISPLAY DEVICE

[75] Inventor: Noah Orlen, Boca Raton, Fla.

[73] Assignee: Motorola, Inc., Schaumburg, Ill.

[21] Appl. No.: 80,639

[22] Filed: Jun. 24, 1993

[51] Int. Cl.⁶ ...................................................... G09G 3/36
[52] U.S. Cl. .............................. 345/98; 345/87; 358/440
[58] Field of Search ..................................... 358/426, 440; 345/98, 87, 94, 90, 99, 100, 208; 359/54, 55; 340/825.44; 395/160; 382/240

[56] References Cited

U.S. PATENT DOCUMENTS

| | | | |
|---|---|---|---|
| 3,668,639 | 6/1972 | Harmuth | 178/7.3 D |
| 4,731,606 | 3/1988 | Bantz et al. | 345/118 |
| 4,897,733 | 1/1990 | Sakaguchi et al. | 358/433 |
| 4,933,770 | 6/1990 | DeSpain | 358/434 |
| 4,952,036 | 8/1990 | Gulick et al. | 350/335 |
| 5,020,120 | 5/1991 | Weldy | 382/56 |
| 5,060,036 | 10/1991 | Choi | 357/23.7 |
| 5,291,302 | 3/1994 | Gordon et al. | 358/440 |
| 5,331,431 | 7/1994 | Fasinski | 358/462 |

FOREIGN PATENT DOCUMENTS

| | | |
|---|---|---|
| 0033545 | 8/1981 | European Pat. Off. . |
| 0507061 | 10/1992 | European Pat. Off. . |

OTHER PUBLICATIONS

Terry Scheffer and Jurgen Nehring, "Supertwisted Nematic (STN) LCDs," May 17, 1992, paper submitted to 1992 SID International Symposium, Boston, Mass.
U.S. Patent Application No. 14251–43, filed May 14, 1992, by Scheffer et al., entitled "Gray Level Addressing for LCDs".
European Patent Application No. 92102353.7, filed Feb. 12, 1992, by Scheffer et al., entitled "Gray Level Addressing for LCDs".
"Active Addressing Method for High–Contrast Video–Rate STN Displays", SID 92 Digest, T. J. Scheffer, B. Clifton, pp. 228–235.

Applications of Walsh Functions, 1973 proceedings pp. 1–9, Harmuth.

Applications of Walsh functions in communications IEEE Spectrum 1969, Henning F. Harmuth, pp. 82–91.

Circuity for the Reception of Walsh Waves, Thomas H. Frank, Apr. 1994.

*Primary Examiner*—Tommy P. Chin
*Assistant Examiner*—Doon Chow
*Attorney, Agent, or Firm*—Keith A. Chanroo

[57] ABSTRACT

A selective call signaling system (10) capable of facsimile communication with a selective call receiver (40) having an active addressing display (100) comprising picture elements (pixels) (108) controlled by a plurality of first and second electrodes (106, 104). A data compressor (12) compresses the data. A transmitter (30) transmits the compressed data organized in frames to the selective call receiver (40). The selective call receiver (40) comprises a receiver (60) receiving the compressed data; the active addressing display (100) displaying the compressed data. The active addressing display (200) comprises a controller (500) controlling the plurality first electrodes (106) by a plurality of periodic first drive signals (400) represented as a sequency ordered Walsh Hadamard transform (WHT) matrix (300) and the plurality of second electrodes (104) by a plurality of second drive signals responsive to the compressed data. A processor (510) calculates the plurality of second drive signals directly from the compressed data and identifies a plurality of hierarchical tree structures (FIG. 11) corresponding to the WHT matrix (300) for processing the frames of compressed data directly with hierarchical tree structures (FIG. 11).

21 Claims, 9 Drawing Sheets

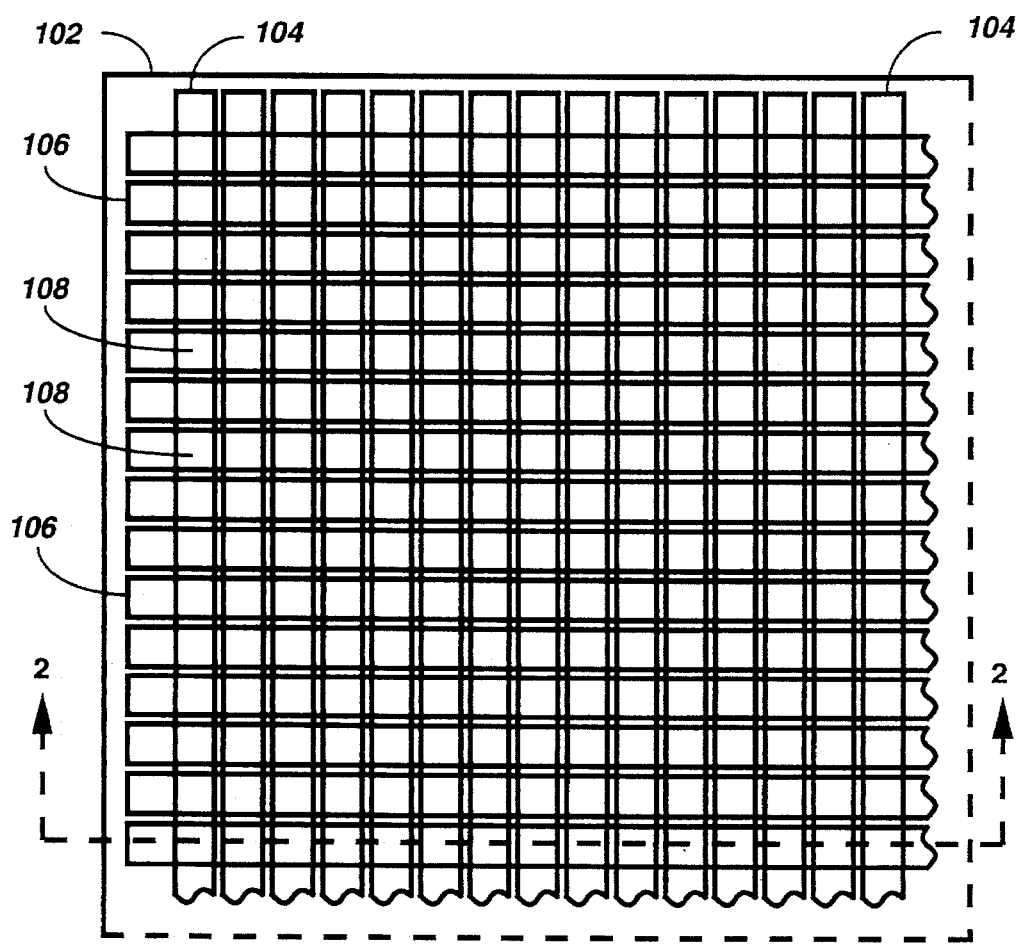
FIG. 3  *100*  PRIOR ART
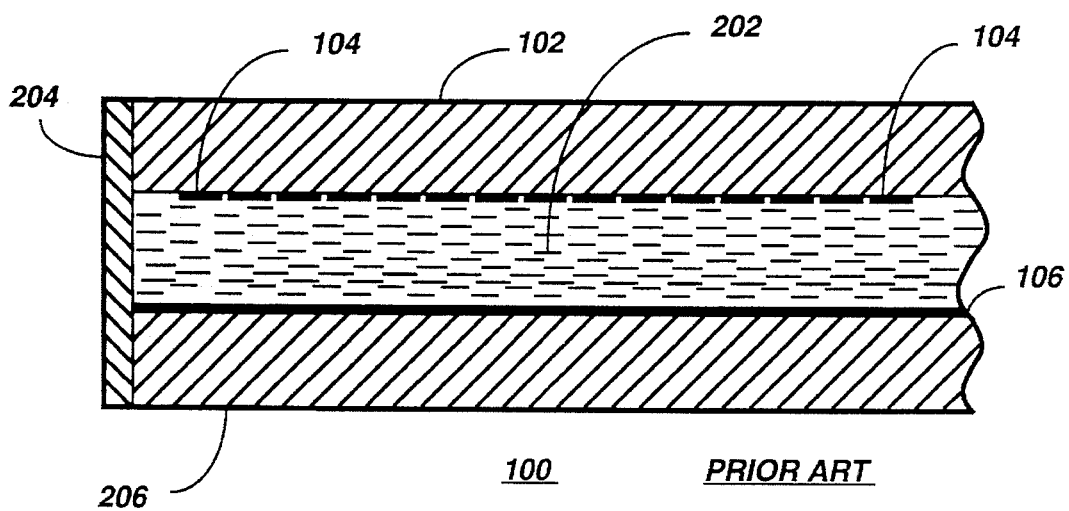
FIG. 4  *100*  PRIOR ART $$\begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix}$$

300

400

5,459,482

FACSIMILE COMMUNICATION WITH AN ACTIVE ADDRESSING DISPLAY DEVICE

FIELD OF THE INVENTION

This invention relates in general to facsimile communications and more specifically to a method and apparatus for facsimile communication with an active addressing display.

BACKGROUND OF THE INVENTION

Contemporary paging systems employ messaging schemes that can deliver voice, numeric, or alphanumeric messages to a user. The majority of paging systems transmit address and message information using a protocol such as GSC (Motorola's Golay Sequential Code) or POCSAG (Great Britain's Post Office Code Standardization Advisory Group). To originate a message or page, the base station or paging terminal is typically accessed via the PSTN from a telephone. As a voice message entry device, the telephone is acceptable but when data needs to be entered, an alternative means of entry is desirable. Alternative entry devices such as computer terminals or custom entry devices work well if the originator can convey information to the user in a textual format. Unfortunately, when a user must convey a large amount of information, existing paging systems and data transport protocols do not allow for the transmission of either long textual messages or messages containing graphical data. Thus, for reasons associated with the data entry problem, most paging service providers do not provide alphanumeric paging message services. To display the message, the selective call receivers need high information content displays that require a large number of picture elements (pixels) to portray arbitrary patterns of information. Recent technological advances have produced LCDs with time constants approaching the frame period used in many video displays (approximately 16.7 milliseconds). Such a short time constant allows the LCD to respond quickly and is especially advantageous for depicting motion without noticeable smearing of the displayed image.

When the display is an active addressing display, it can be shown mathematically that there is applied to each pixel of the display a root-mean-square (rms) voltage averaged over the frame period, and that the rms voltage is proportional to each pixel value for the frame. The advantage of active addressing is that it restores high contrast to the displayed image because instead of applying a single, high level selection pulse to each pixel during the frame period, active addressing applies a plurality of much lower level (2–5 times the rms voltage) selection pulses spread throughout the frame period. In addition, the much lower level of the selection pulses, the probability of alignment instabilities are substantially reduced.

A problem, however, with active addressing results from the large number of calculations required per second. For example, a gray scale display having 480 rows and 640 columns, and a frame rate of 60 frames per second requires just under ten billion calculations per second. While it is of course possible with today's technology to perform calculations at that rate, the architecture proposed to date for calculation engines used for active addressed displays have not been optimized to minimize power consumption. The power consumption and calculation speeds are issues of particularly importance to display units of portable devices that are powered by limited energy battery power supplies. To compound this problem, when facsimile communication is being received by the selective call receiver, the selective call receiver which is a portable battery powered device must also receive, decompress, and decode the data while performing a large number of calculations to display the data on the electronic display.

Thus, what is needed is a method and apparatus, in a portable device, for facsimile communication that does not increase the power consumption for displaying large amount of data.

SUMMARY OF THE INVENTION

In a selective call receiver having an active addressing display comprising picture elements (pixels) controlled by a plurality of first and second electrodes, a method of facsimile communication, comprising the steps of:
(a) receiving data transmitted in frames and compressed to form compressed data; and
(b) displaying the compressed data on the active addressing display. The step of displaying comprising the steps of:
(c) controlling the plurality first electrodes by a plurality of periodic first drive signals represented as a sequency ordered Walsh Hadamard transform (WHT) matrix and the plurality of second electrodes by a plurality of second drive signals responsive of the compressed data;
(d) calculating the plurality of second drive signals directly from the compressed data wherein the step of calculating further comprises a step of identifying a plurality of hierarchical tree structures corresponding to the WHT matrix; and
(e) processing the frames of compressed data directly with hierarchical tree structures for displaying the data on the active addressing display.

A selective call signaling system capable of facsimile communication with at least one selective call receiver having an active addressing display comprising picture elements (pixels) controlled by a plurality of first and second electrodes. The selective call signaling system comprises means for compressing data forming compressed data. A transmitter for transmitting the compressed data organized in frames to the at least one selective call receiver. The selective call receiver comprises a receiver for receiving the compressed data; an active addressing display for displaying the compressed data. The active addressing display comprises a controller for controlling the plurality first electrodes by a plurality of periodic first drive signals represented as a sequency ordered Walsh Hadamard transform (WHT) matrix and the plurality of second electrodes by a plurality of second drive signals responsive of the compressed data being displayed. A processor comprises means for calculating the plurality of second drive signals directly from the compressed data and means for identifying a plurality of hierarchical tree structures corresponding to the WHT matrix for processing the frames of compressed data directly with hierarchical tree structures.

BRIEF DESCRIPTION OF THE DRAWINGS

FIG. 3 is a front orthographic view of a portion of a conventional liquid crystal display.

FIG. 4 is an orthographic cross-section view along the line

2—2 of FIG. 3 of the portion of the conventional liquid crystal display.

Figures 5, 6:
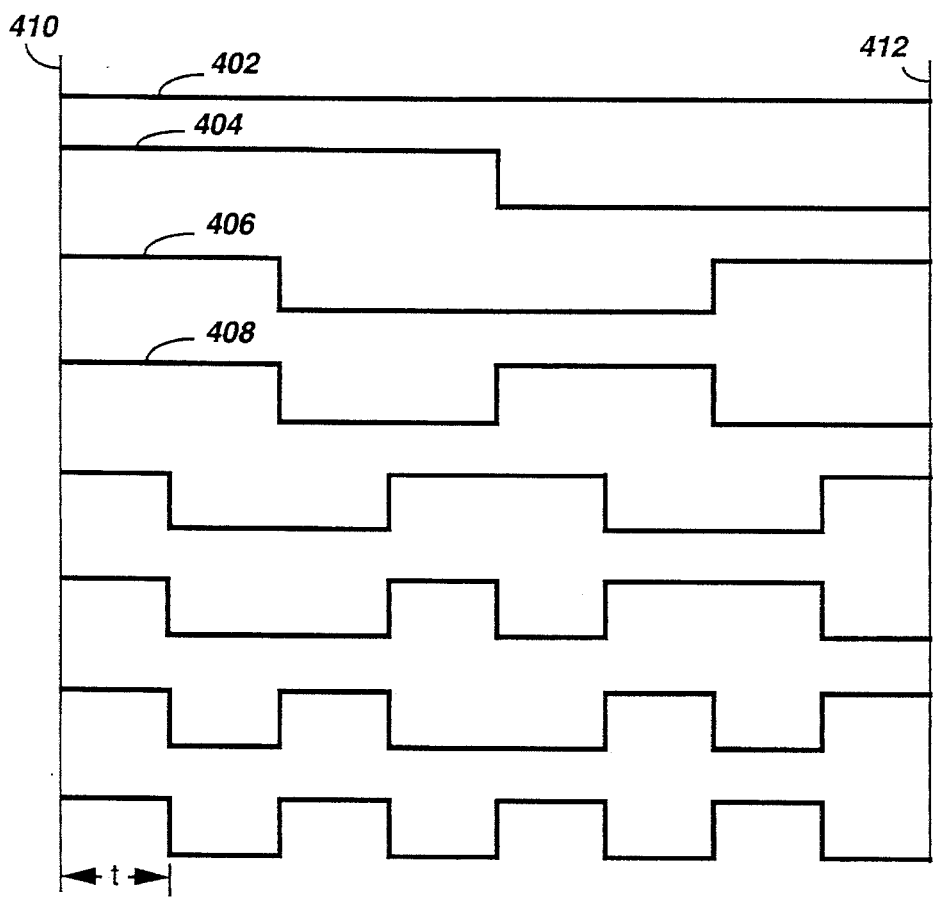

FIG. 5 is an eight-by-eight matrix of Walsh Hadamard Transform functions in accordance with the preferred embodiment of the present invention.

FIG. 6 depicts drive signals corresponding to the Walsh Hadamard Transform functions of FIG. 5 in accordance with the preferred embodiment of the present invention.

Figure 7:
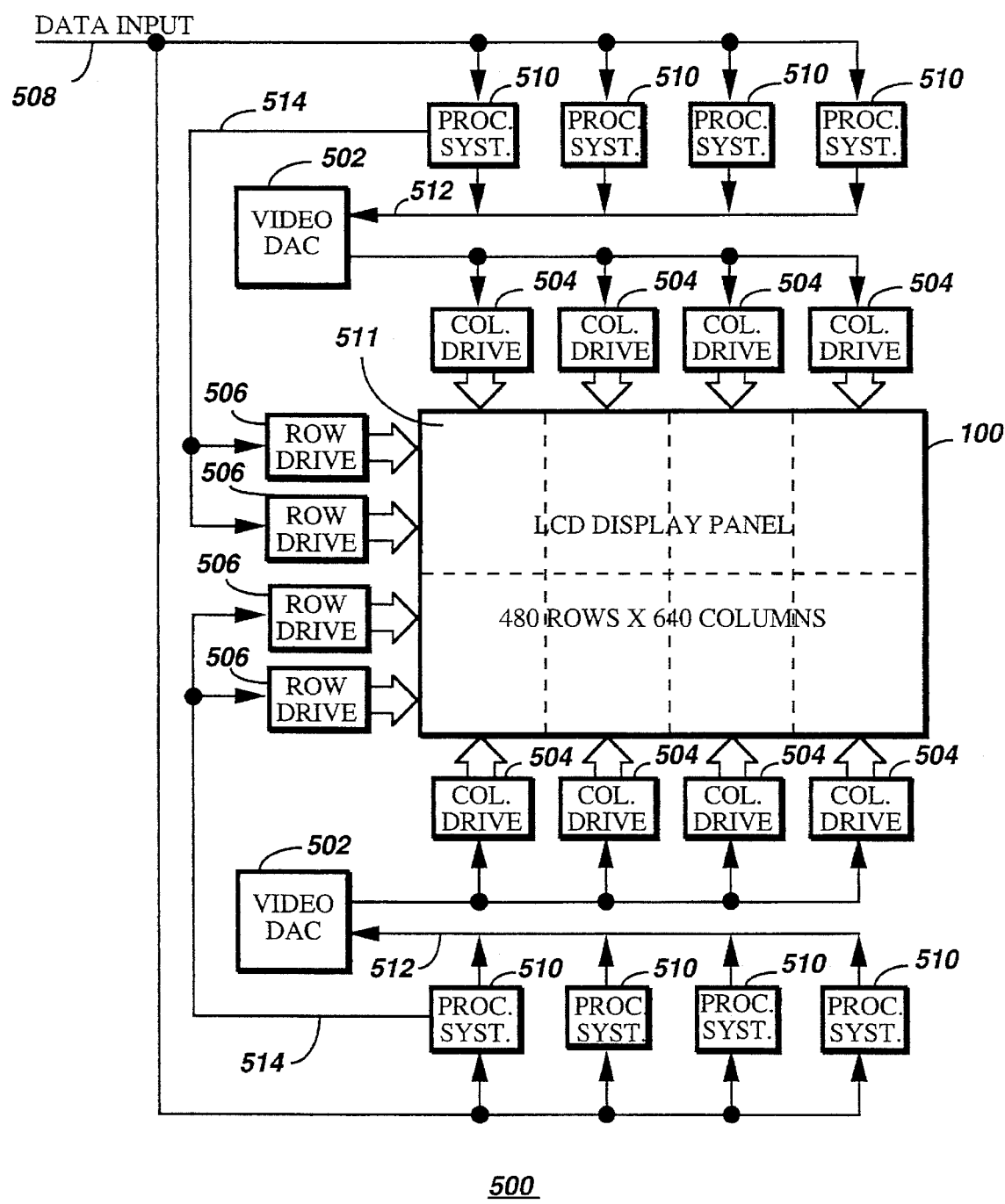

FIG. 7 is an electrical block diagram of a display system in accordance with the preferred embodiment of the present invention.

Figure 8:
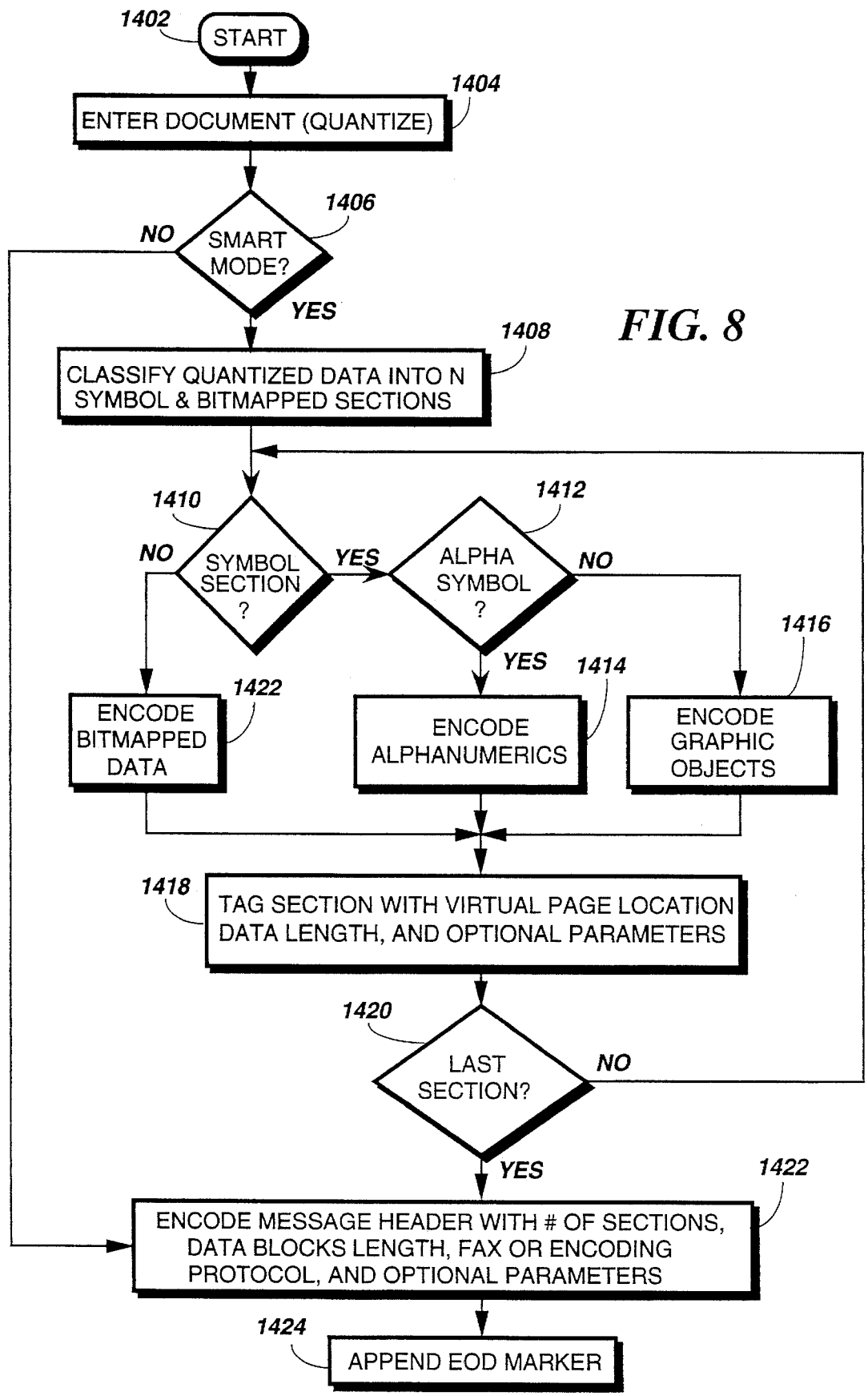

FIG. 8 is a flow diagram illustrating the encoding and compressing of a typical message by a facsimile message input processor in accordance with the preferred embodiment of the present invention.

Figure 9:
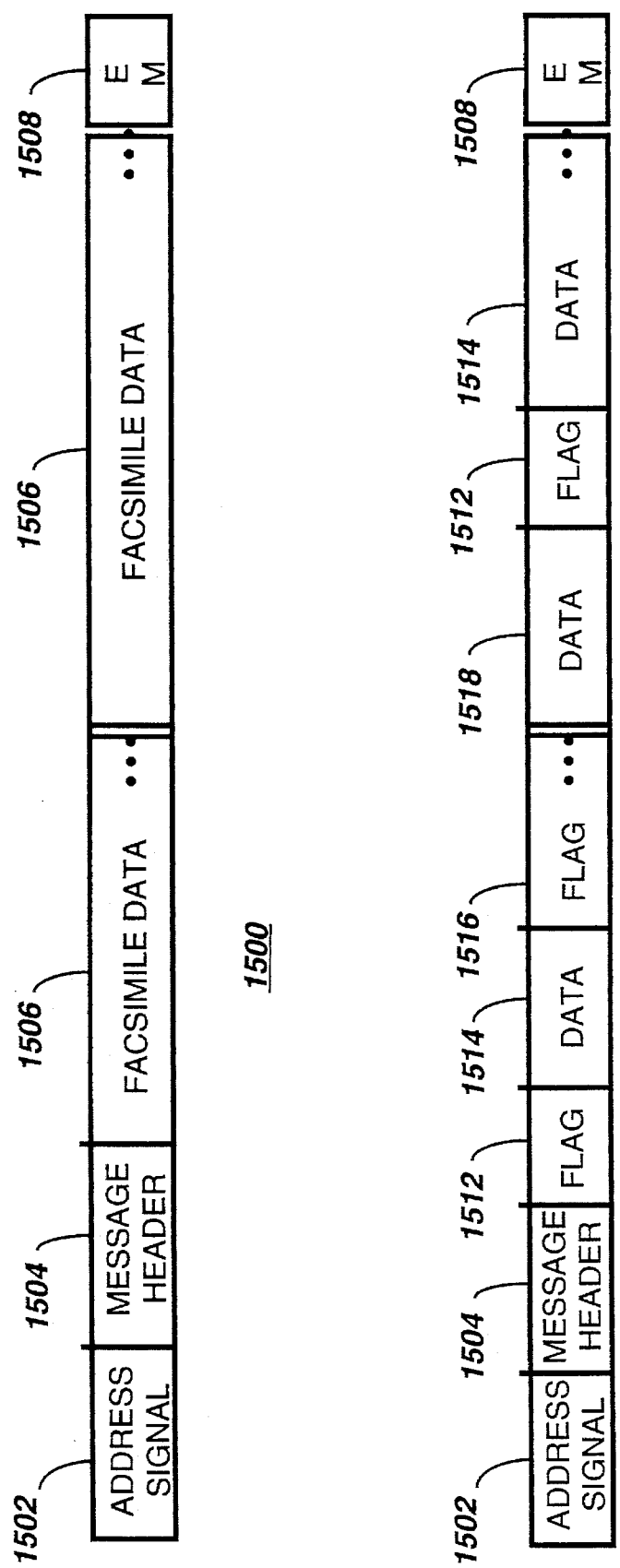

FIG. 9 is a protocol diagram of a selective call information signaling format in accordance with the preferred embodiment of the present invention.

Figure 2:
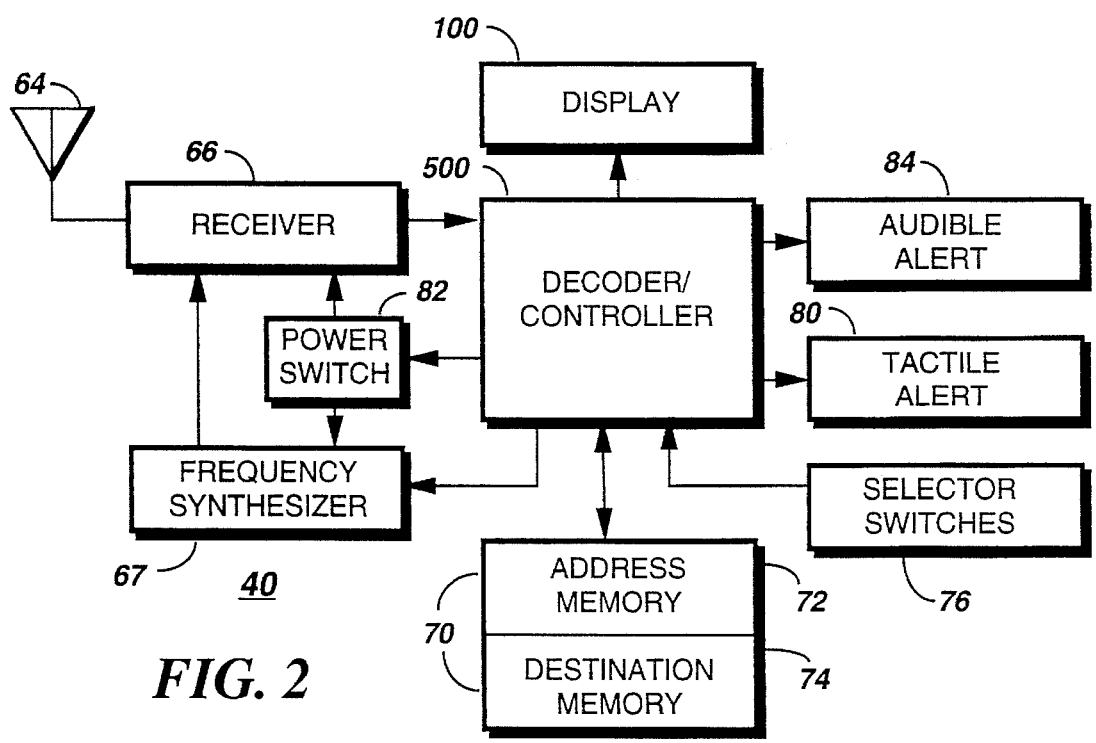
FIG. 2 is an electrical block diagram of a selective call receiver in accordance with the preferred embodiment of the present invention.
Figure 10:
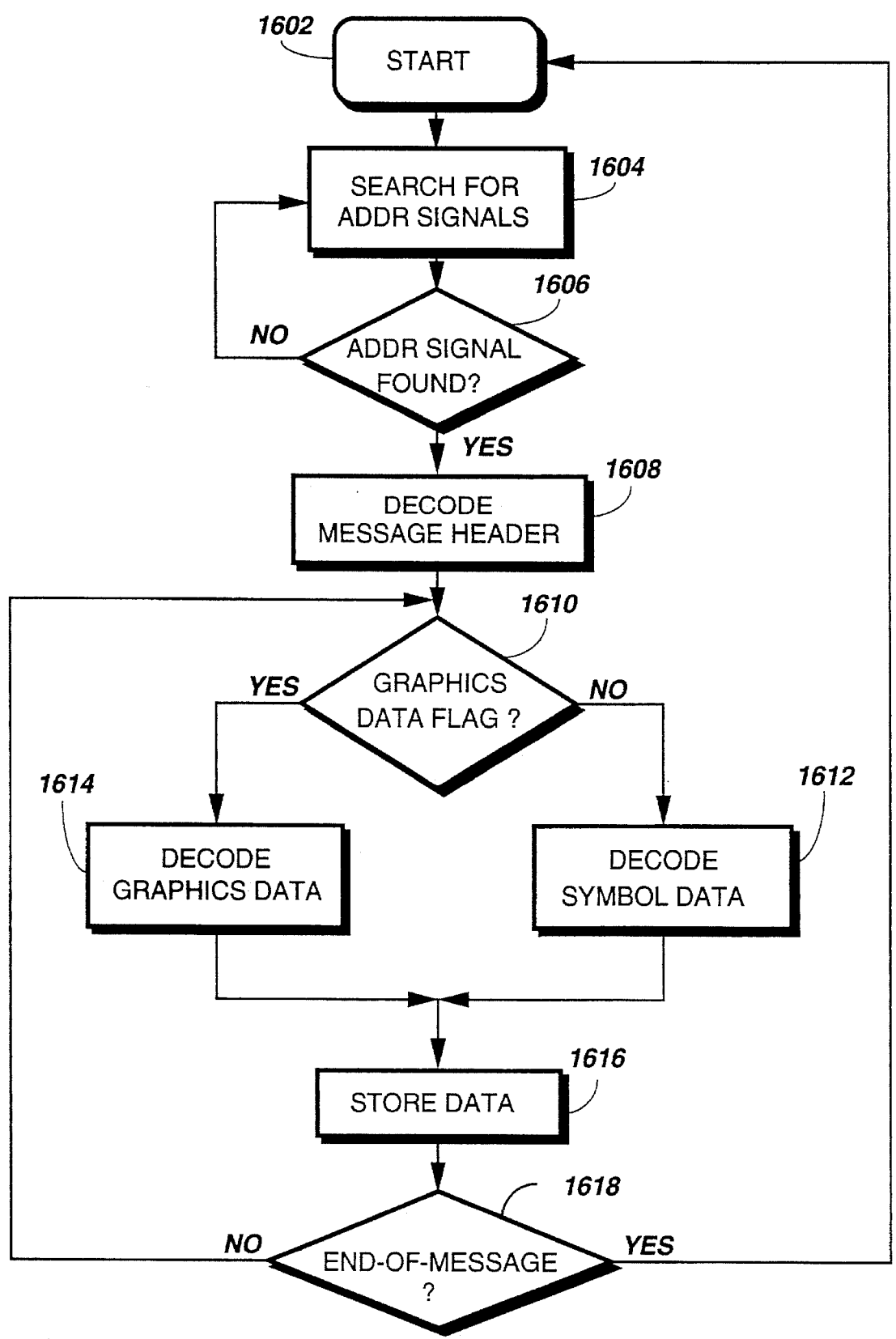

FIG. 10 is a flow diagram illustrating operation of the selective call receiver of FIG. 2 when receiving a facsimile paging message.

Figure 11:
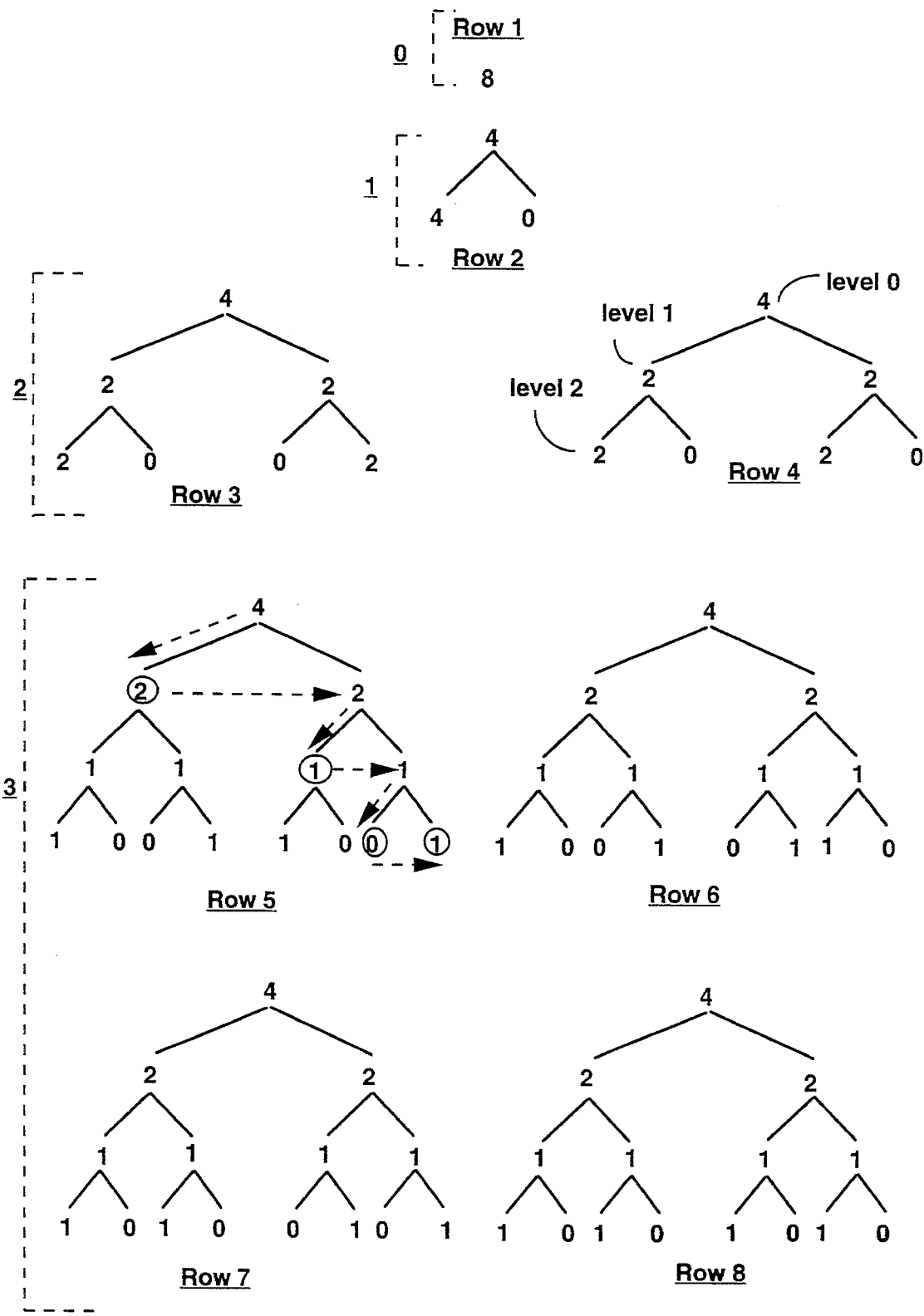

FIG. 11 is a series of hierarchical tree structures illustrating the rerepresentation of the WHT matrix in accordance with the preferred embodiment of the present invention.

Figure 12:
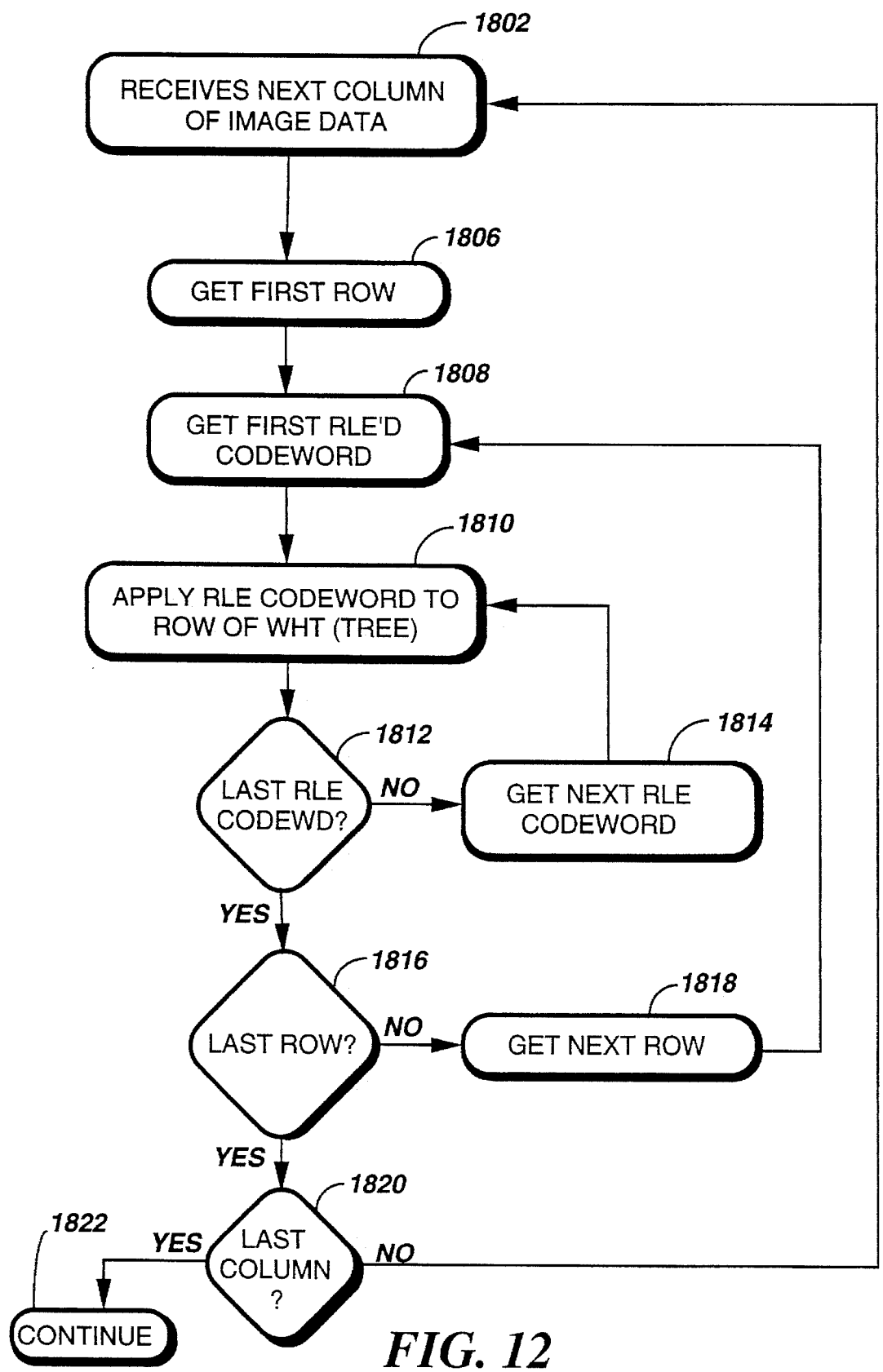

FIG. 12 is a flow diagram illustrating the displaying operation of the selective call receiver having the active addressing display using the hierarchical tree structures in accordance with the preferred embodiment of the present invention.

DESCRIPTION OF A PREFERRED EMBODIMENT

Figure 1:
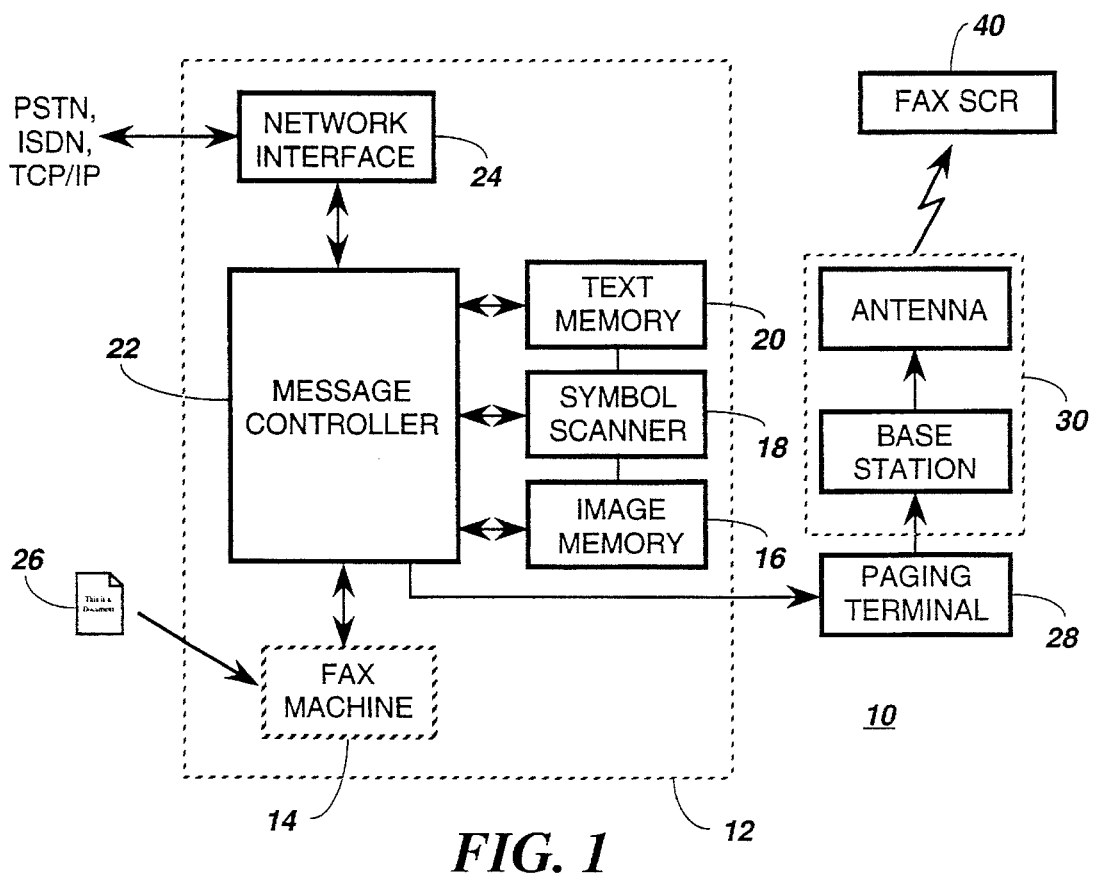
FIG. 1 is an electrical block diagram of a selective call information signaling system in accordance with the preferred embodiment of the present invention.

Referring to FIG. 1, an electrical block diagram of a selective call information signaling system is shown in accordance with the preferred embodiment of the present invention. The selective call information signaling system 10 shows a facsimile message input processor 12 comprising: a conventional facsimile (FAX) machine 14, an image memory 16, a symbol recognition processor (scanner) 18, a text memory 20, a message controller 22, and a network interface 24. A source document 26 is read (or scanned) by the FAX machine 14 that quantizes the image. The FAX machine 14 is coupled to the message controller 22. Alternatively, the FAX machine 14 need not be located at the same physical site as the facsimile message input processor 12, and in fact can be replaced by a number of devices such as a computer, a conventional document scanner, or possibly a dedicated message entry device, each communicating in the alternative with the facsimile message input processor 12 via the network interface 24.

In a first embodiment, a user wanting to send a FAX to a subscriber (a person or device having a FAX selective call receiver 40) would call the subscriber's paging service provider using a conventional telephone and enter the user's cap-code number (a unique number assigned by the paging service provider that corresponds to the actual coded address of the selective call receiver). The paging service provider maintains a list of FAX capable cap-codes number and upon receiving the entered capcode number will initiate a procedure to receive a conventional facsimile message. The user would then put the conventional facsimile machine 14 "on-line", load, and transmit the document to the facsimile message input processor 12 at the paging service provider. After receipt of the FAX message, the facsimile message input processor 12 will encode, compress and transmit a paging message to the targeted subscriber. The method, protocol, and apparatus required for the transmission of the paging message will be discussed in detail below.

In a second embodiment, a user wanting to send a FAX to a subscriber uses the conventional facsimile machine 14 that has a feature allowing the storage of a list of predetermined telephone numbers. In this embodiment, a FAX message can be originated either manually by keying in a phone number or by recalling the phone number from a memory in the originating FAX machine. The user's cap-code number may be represented by an alias or nickname that points to a predetermined memory location containing the cap-code number and the telephone number of the paging service provider. When originating a FAX message, the person sending the message would recall (or dial) the paging service's number and enter (or the machine would automatically, upon establishing a connection with the service) the user's cap-code number. After successfully connecting with the paging service provider, the facsimile machine would transmit the document to the facsimile message input processor 12.

In a third embodiment, the conventional facsimile machine would include a feature allowing for the scanning of an area of the FAX message for a "key" that selects at least one paging service and at least one paging user (subscriber). The selection of the paging service and target subscriber is accomplished by recognizing typewritten or handwritten characters, a selected "check box," or possibly a bar-code. In any case, the recognized object can represent either directly (absolute data) or indirectly (as a pointer to information stored in a memory location in the facsimile machine) the targeted system and user. Another alternative might be to affix a pre-printed label to the FAX document in an area of the document. The label containing coded (e.g., bars, symbols, etc.) information representing the user's paging service and cap-code number. Another option would be to use pre-printed forms that define the input area, or by requiring the sender to define the relevant area by drawing a box around the text to be transmitted. Similarly, with the previous embodiments, once "contact" is established with the paging service, the FAX document is transmitted.

In the preferred embodiment of the present invention, the FAX machine 14 is closely coupled to the facsimile message input processor 12. This preferred embodiment includes all the capabilities discussed in reference to the first three embodiments and further improves on their performance by not requiring a public switch telephone network (PSTN) connection to originate a paging request. In this embodiment, the facsimile message input processor 12 can be directly connected to a paging terminal 28 via a high speed network (e.g., RS-232, IEEE 802.3), thus resulting in extremely high message throughput.

When the document has been entered (scanned) into the FAX machine 14, the message controller 22 directs the quantized data to at least one of the image memory 16, the symbol recognition processor 18, and the text memory 20. After storing at least a portion of the document in the image memory 16, the message controller 22 begins processing the document. At this point, the symbol (e.g., alphanumeric characters, conventional graphics) recognition processor 18 is working with at least a portion of the quantized image that is scanned to determine which areas comprise recognizable symbols (e.g., ASCII text, Kanji, etc.) or graphical data. Using conventional techniques, the symbol recognition processor 18 maps (or classifies) the areas in image memory 16 into either symbol or graphical sections. In the process of mapping the quantized data, each section is marked for relative (or absolute) page position and its boundaries on the original document. This process allows the document to be broken up into its component parts to be re-assembled after transmission in response to the markers corresponding to each section.

After mapping the quantized image, the message controller 22 directs the symbol recognition processor 18 to identify the symbols in each mapped symbol section. The resulting codes for the identified symbols are then stored in the text memory 20. The identification of each symbol results in a data word that has a one-to-one correspondence with the quantized graphical symbol in image memory 16 from which it was derived. By identifying the symbols with a data word, the amount of information that must be encoded, compressed, transmitted, received, and decoded by the selective call information signaling system is substantially reduced. Using a resolution of, for example, 200 by 200 dots-per-inch (dpi) and assuming a message containing 35 lines having an average of 50 characters-per-line on an A4 page size (approximately 21.0 by 29.7 cm) and containing only text. The binary quantization of that message contains approximately four million bits of data. To transmit this message, assuming a byte oriented serial protocol with no error correction, would take 403 seconds at 1200 baud (one baud is defined as one symbol having eight information bits-per-second). The resulting transmission time of almost seven-minutes-per-page is impractical in terms of the economics of using a radio frequency paging channel.

However, when the message is sent, according to the preferred embodiment of the present invention, using a Group III facsimile (FAX) machine as defined under the CCITT (Consultative Committee on International Telegraph and Telephone) Facsimile Standard for Group III facsimile, it is first encoded and compressed using a coding scheme known as the modified Huffman code. The modified Huffman code uses the standard Huffman code in conjunction with the modified READ (Relative Element Addressing Designate) code.

Standard Huffman coding scheme performs a search of "n" bit data words and typically uses a predetermined look-up table to encode "commonly" repeated sequences with words having fewer bits than the original data word. Variations of the standard Huffman code can improve coding efficiency by forming a dynamic encoding table on the basis of the statistical occurrence of a pattern within the data stream being analyzed for encoding.

The Modified READ code is a line-by-line scheme in which the position of each changing element on the coding line is coded with respect to either the position of a corresponding changing element on the reference line, which lies immediately above the coding line, or with respect to the preceding changing element on the coding line. The two modes in the modified READ code are vertical and horizontal or passing modes. Vertical mode coding uses only one bit to indicate the situation when a black pel (picture element) run of the coding line start directly under a black pel run of the reference line. If the changing pel pairs are not within three (3) pels, then either horizontal or passing mode coding is used. After the line has been coded, it becomes the reference line for the next line. Since each coded line becomes the reference line for the next line, then a single error can propagate over several lines which means that this method of two-dimensional coding is vulnerable to repetitive transmission errors. Therefore, Group III facsimile using the modified Huffman coding periodically prevents an error pattern from developing. At a resolution of 200 by 200 dpi, every fourth line is coded with the modified Huffman coding and the rest with the modified READ code to prevent errors and decrease transmission time.

The Modified Huffman code takes into account only the horizontal dependencies between pels on the same scan line. Operationally, modified Huffman coding works as described in the following text. Consider an A4 document that has 1728 pels/line and 3.85 lines/mm. Each scan line is regarded as sequence of alternating black and white runs. All scan lines are assumed to start with a white run length of zero or more bits. The white and black run lengths of 0 to 63 bits are represented by terminating code words and white and black run lengths of 64 to 1728 bits are represented by make-up code words followed by terminating code words. Each code line is then followed by the end-of-line code word that is a twelve bit code that cannot be duplicated by any type or combination of code words. The modified Huffman code described is the easiest coding scheme to implement and yields an average compression ratio of about twenty-to-one.

Applying the modified Huffman code discussed above, the sample message transmission (after scanning) would take 92 seconds at 1200 baud (assuming 100 transitions per text information line and 33% of the document's area containing text information, yielding approximately 110 Kbytes of data). Applying symbol recognition as discussed in reference to the preferred embodiment of the facsimile message input processor 12, this message takes only 1.5 seconds to transmit (approximately 1800 bytes of data). As can be seen from the previous discussion, transmission of the message using the facsimile message input processor 12 yields an improvement of 269 times over binary data and 61 times over Group III facsimile machines. When these examples are presented using a typical over-the-air coding scheme such as GSC (Motorola's Golay Sequential Code) or POCSAG (Great Britain's Post Office Code Standardization Advisory Group), the overhead increases by the amount of parity bits associated with the code selected and thus increases the total transmission time by the ratio of the coded data to the un-coded data. In the case of GSC which is a (23,12) code (23 total bits of which 11 are parity bits and 12 are data bits), one would expect to see an increase in time of approximately 109% (i.e., 842 seconds for binary, 192 seconds for Group III FAX, and 3.1 seconds for the facsimile message input processor 12) as compared to the un-coded data.

Graphical sections can be handled in much the same way as text by identifying simple graphic shapes (e.g., circles, squares, lines, filled areas, etc.) and coding each with a corresponding unique data word. This technique can also be applied to complex graphical regions (e.g., grayscale, color, logos) that cannot be practically reduced beyond a bitmap. These bitmapped graphical sections can be coded using conventional one, two, and three dimensional compression algorithms similar to the modified Huffman coding scheme to further reduce the amount of data that must be transmitted. The graphical sections can also be adaptively scaled and quantized by the facsimile message input processor 12 to meet the requirements of the display 100 of the selective call receiver 40. The mapping discussed enables the preferred embodiment of the selective call information signaling system 10 to be fully compliant with the 1984 CCITT recommendations for Group III standard.

The facsimile message input processor 12 is also capable of receiving and sending Group III and Group IV facsimile transmissions via the network interface 24. At least one input is included to accept Group III transmissions at 4,800 or 9,600 baud via the public switched telephone network (PSTN), as well as Group IV transmissions at 48,000 baud via a high speed data network such as the emerging Integrated Services Digital Network (ISDN). The network interface 24 can be expanded to include hardware to accommodate high speed coaxial or optical communication to local or wide area networked computer systems as well as ISDN devices. This gives an added dimension of flexibility for the user by allowing the origination of a FAX directly from any compatible device on the network.

Once the document 26 has been scanned and processed by the facsimile message input processor 12, the resulting coded data is coupled to the paging terminal 28 where the message data is further encoded using a protocol suitable for the transmission of information via a radio frequency link. Such protocols are GSC (Motorola's Golay Sequential Code) or POCSAG (Great Britain's Post Office Code Standardization Advisory Group). These protocols add error detection and correction capabilities to the information link, thus insuring the delivery of error free data to the paging user. The paging terminal 28 also serves to control a transmitter 30 (or transmitters in a multi-cast system) and to generate a queue for incoming and outgoing paging messages. Furthermore, as previously discussed in reference to the facsimile message input processor 12, the graphical sections of received facsimile messages for re-transmission can be adaptively scaled and quantized by the paging terminal 28 to meet the requirements of an active addressing display 100 of the selective call receiver 40 to be discussed in detail below.

When the paging terminal 28 has completed processing the incoming message, the transmitter 30 broadcasts a signal modulated with data representing a selective call address and the message. A selective call receiver 40 detects its address, recovers the message, alerts the user, and makes the received information available for presentation to the user in a variety of formats including but not limited to characters, graphics and audio. Some specialized applications that can be accommodated by the preferred embodiment of the selective call information signaling system 10 are electronic mail, storage, retrieval, and forwarding of facsimile messages, and integration of text with graphics into a compound document architecture compatible with industry standard computer productivity software applications.

Referring to FIG. 2, an electrical block diagram of the selective call receiver is shown in accordance with the preferred embodiment of the present invention. The selective call receiver 40 comprises an antenna 64 for intercepting transmitted radio frequency (RF) signals which is coupled to the input of a receiver 66. The receiver 66 provides for reception of transmissions on a single reception frequency, Or, as will be further described below, reception on multiple reception frequencies. When multiple frequency reception is provided, a frequency synthesizer 67 enables the generation of the multiple reception frequencies in a manner well known to one of ordinary skill in the art. The receiver 66 receives and demodulates the transmitted signals, preferably frequency modulated data signals, providing at the output of the receiver a stream of binary data signals corresponding to the destination IDs transmitted from any particular destination location. The binary data signals are coupled into the input of a decoder/controller 68 which processes the signals, in a manner well known in the art, comparing the received destination IDs with the predetermined destination ID corresponding to the destination to which the user has preselected. A memory 70, coupled to the decoder/controller 68, includes a table of destination IDs, or addresses, which are stored in the destination memory 74 section of the memory 70. Selector switches 76 are provided to enable the selection of one or more destination addresses identifying destinations at which the user wishes to be notified. The active addressing display 100 is provided which is utilized to display the destination information stored in the destination memory 74, thereby enabling the user to readily select the destination at which an alert is desired, as will be described below. The decoder/controller 68 compares the received destination IDs with the predetermined destination address selected by the user from the destination memory 74, and when a match is detected, the decoder/controller 68 generates an alert enable signal which is coupled to the input of a sensible alerting device, such as the tactile alerting device 80. The tactile alerting device 80 preferably provides a silent vibratory output alerting the user that the destination selected is being approached.

When the selective call receiver is used to provide both destination notification alerting and paging capability, the addresses assigned to the selective call receiver for use in the selective call information signaling system are stored in the address memory 72 portion of memory 70. The decoder/controller 68 then controls the generation by the frequency synthesizer 67 of the selective call information signaling system's frequency or the paging system's frequency, to enable selectively receiving signals on a paging channel or the selective call system channel. A power switch 82 is coupled to the decoder/controller 68 is used to control the supply of power to the receiver 66, thereby providing a battery saving function, as is well known in the art for use with selective call receivers. When the paging channel is selected, the received paging address signals are processed by the decoder/controller 68, and when a paging address signal is detected which corresponds to an assigned address of the selective call receiver, the decoder/controller 68 generates an alert enable signal which can be coupled to an audible alerting device 84, such as an audible transducer, to provide an audible alert, or can be coupled to the tactile alerting device 80 to provide a silent alert. Selection of either audible or silent alerting is provided by the selector switches 76 in a manner well known in the art.

Referring to FIGS. 3 and 4, an orthographic front view and a cross-sectional view of a portion of the active addressing display 100 that comprises a liquid crystal display (LCD) is shown. The active addressing display 100 depicts first and second transparent substrates 102, 206 having a space therebetween filled with a layer of liquid crystal material 202. A perimeter seal 204 prevents the liquid crystal material from escaping from the LCD 100. The LCD 100 further includes a plurality of transparent electrodes comprising row electrodes 106 positioned on the second transparent substrate 206, and column electrodes 104 positioned on the first transparent substrate 102. At the points (or areas) at which a column electrode 104 overlap a row electrode 106, herein referred to as the overlap 108, voltages are applied to the electrodes 104, 106 to control the optical state of the liquid crystal material 202 therebetween, thus forming a controllable picture element (pixel) defined by the overlap 108. While an LCD is the preferred display element in accordance with the preferred embodiment of the present invention, it will be appreciated that other types of display elements can be used as well, provided that such other types of display elements exhibit an optical characteristic responsive to the square of the voltage applied to each pixel, similar to the root-mean-square (rms) response of an LCD.

Referring to FIGS. 5 and 6, as an example, a representation of an eight-by-eight (third order) matrix of Walsh-Hadamard Transform matrix (hereinafter to as Walsh or WHT) functions 300 and the corresponding Walsh-Hadamard waves 400 are shown in accordance with the preferred embodiment of the present invention. Walsh transform matrix functions are orthonormal and are thus preferable for use in an active addressing display system, as discussed above. When used in such a display system, voltages having levels represented by the Walsh waves 400 are uniquely applied to a selected plurality of electrodes of the LCD 100. For example, the Walsh waves 404, 406, and 408 could be applied to the first (uppermost), second, and third row electrodes 106, respectively, and so on. In this manner each of the Walsh waves 400 would be applied uniquely to a corresponding one of the row electrodes 106. It is preferable not to use the Walsh wave 402 in an LCD application because the Walsh wave 402 would bias the LCD with an undesirable DC voltage.

It is of interest to note that the values of the Walsh waves 400 are constant during each time slot, t. The duration of the time slot, t, for the eight Walsh waves 400 is one-eighth of the duration of one complete cycle, T, of Walsh waves 400 from start 410 to finish 412. When using Walsh waves for active addressing a display, the duration of one complete cycle of the Walsh waves 400 is set equal to the frame duration which is the time to receive one complete set of data for controlling all the pixels 108 of the display 100.

The eight Walsh waves 400 are capable of uniquely driving up to eight row electrodes 106 (preferably, seven if the Walsh wave 402 is not used). It will be appreciated that a practical display has many more rows and columns. For example, displays having four-hundred-eighty rows and six-hundred-forty columns are widely used today in laptop computers. Walsh function matrices are available in complete sets determined by powers of two, and because the orthonormality requirement does not allow more than one electrode to be driven from each Walsh wave, a five-hundred-and-twelve by five-hundred-and-twelve ($2^9 \times 2^9$) Walsh function matrix would be required to drive a display having four-hundred-and-eighty row electrodes 106. For this case the duration of the time slot, t, is 1/512 of the frame duration. Four-hundred-and-eighty Walsh waves would be used to drive the four-hundred-and-eighty row electrodes 106 while the remaining thirty-two would be unused, preferably including the first Walsh wave 402 having a DC bias.

Referring to FIG. 7, an electrical block diagram of a display system 500 is shown in accordance with the preferred embodiment of the present invention. The display system 500 comprises a plurality of processing systems 510 coupled to a data input line 508, preferably eight bits wide, for receiving frames of data to be displayed. To reduce calculation requirements for each of the processing systems 510, the LCD 100 has been partitioned into eight areas 511 (illustrated by the broken lines), each serviced by one of the processing systems 510, and each containing one-hundred-sixty column electrodes 104 and two-hundred-forty row electrodes 106.

The processing systems (or calculation engines) 510 are coupled by column output lines 512, preferably eight bits wide, to video digital-to-analog converters (DACs) 502, such as the model CXD1178Q DAC manufactured by Sony Corporation, for converting the digital output signals of the processing systems 510 into corresponding analog column drive signals. The DACs 502 are coupled to column drive elements 504 of an analog type, such as the model SED1779DOA driver manufactured by Seiko Epson Corporation, for driving the column electrodes 104 (FIG. 3) of the LCD 100 with the analog column drive signals. Two of the processing systems 510 are also coupled by row output lines 514 to row drive elements 506 of a digital type, such as the model SED1704 driver also manufactured by Seiko Epson Corporation, for driving the row electrodes 106 (FIG. 3) of the upper and lower partitions of the LCD 100 with a predetermined set of Walsh waves. It will be appreciated that other similar components can be used as well for the DACs 502, the column drive elements 504, and the row drive elements 506.

The column and row drive elements 504, 506 receive and store a batch of drive level information intended for each of the column and row electrodes 104, 106 for the duration of the time slot, t, (FIG. 6). The column and row drive elements 504, 506 then substantially simultaneously apply and maintain the drive levels for each of the column and row electrodes 104, 106 in accordance with the received drive level information until a next batch, e.g., a batch corresponding to the next time slot, t, is received by the column and row drive elements 504, 506. In this manner the transitions of the drive signals for all the column and row electrodes 104, 106 occur substantially in synchronism with one another.

Referring to FIG. 8, a flow diagram illustrating the encoding and compressing of a typical message by a facsimile message input processor is shown in accordance with the preferred embodiment of the present invention. For example, when the document has been entered, step 1402, the facsimile message input processor 12 begins to process the document, step 1404. The processor processes the document as a standard CCITT Group III facsimile according to the preferred embodiment or when a "Smart" mode is enabled, in a more efficient manner as described in the following text. When the Smart mode is disabled, step 1406, the facsimile message is characterized in step 1422 by creating the message header in response to the standard facsimile data received. The message is then terminated by an optional end of data (EOD) marker, step 1424. Alternatively, when the Smart mode is enabled, step 1406, the quantized data representing the FAX message is classified by mapping recognizable symbols and graphic bitmaps into N sections where N is an integer greater than or equal to one, step 1408. Step 1410 tests the Mth section (M= 1, 2, 3, . . . N) for being a symbol section. If the Mth section is a symbol section, step 1412 tests for alphanumeric symbols. If step 1412 is true, step 1414 encodes the present symbol section as alphanumeric object words. If step 1412 fails, step 1416 encodes the present symbol section as graphic object words. When a section has completed the encoding process, step 1418 tags the section with a flag comprising its virtual page location, data length or extent, and any optional parameters as detailed in reference to FIG. 9. When the last section has been encoded, step 1420 is true and control is passed to step 1422. If step 1410 would have failed, thus indicating a graphic region with no recognizable objects, the respective region would be encoded by step 1422. Also, if step 1420 fails, then the processor has not completed encoding all recognized sections. When encoding is complete, the resulting message header and data block are available for further encoding in an over-the-air coding scheme for transmission by the paging terminal.

Referring to FIG. 9, a protocol diagram of a selective call signaling format is shown in accordance with the preferred embodiment of the present invention. Illustration 1500 shows the signaling protocol for addressing and transmitting facsimile data to the selective call receiver 40 using any facsimile standard. A FAX paging message packet comprises a selective call address 1502, a facsimile message header 1504, data blocks 1506 encoded in Group III facsimile data, and an end-of-message flag 1508. The end-ofmessage flag 1508 can be omitted without compromising the integrity of this signaling format. The address signal 1502 comprises a conventional selective call address of a type that is well known to one of ordinary skill in the art. The message header 1504 contains information on the data block length, FAX protocol type, and possibly an encryption type for use in a secure FAX messaging system. Following the message header 1504 is the data block 1506 containing standard facsimile data. This embodiment can be used in conjunction with a conventional FAX machine to receive FAX messages via a wireless data channel. Furthermore, when used in conjunction with a personal computer or the like (e.g., a laptop computer), the selective call receiver as illustrated in FIG. 2 can couple the received FAX message data to the computer for storage in a file, thus allowing the user to have an archive of the received FAX messages. Since the received FAX message data is unaltered from its native transmission format, conventional facsimile data manipulation hardware and software can be used to obtain a hardcopy of the received FAX.

An illustration 1510 of an exemplary FAX paging message packet comprises the selective call address 1502, the facsimile message header 1504, a first text data flag 1512, a first text data block 1514, a graphics data flag 1516, a graphics data block 1518, a second text data flag 1512, a second text data block 1514, and the end-of-message flag 1508. The address signal 1502 comprises a conventional selective call address of a type that is well known to one of ordinary skill in the art. The message header 1504 contains the number of sections within a data block, information on the data block length, FAX protocol type, the location of subsequent data blocks on a virtual facsimile page and possibly an encryption type for use in a secure FAX messaging system. The data block comprises all information following the facsimile message header 1504 and preceding the end-of-message flag 1508. The virtual page is a transient, memory based rendition of the final image, whether the final image is a computer file, memory image, or a hardcopy. The first and second text data flags 1512 act as message section delimiters and include information such as the length of the text block and the extent of the area required on the virtual facsimile page. The first and second text data blocks 1512 contain data representing textural symbols from a first and second text sections as mapped during the recognition process. The graphics data flag 1516 acts as a delimiter for the graphics data block 1518 and include the length of the graphics data block 1518, the extent of the area required on the virtual facsimile page, and other information relevant to its contents such as the encoding method or the use of color graphics. The graphics data block 1518 contains graphical data in at least one format such as the modified Huffman coding used for Group III facsimile.

Referring to FIG. 10, the flow diagram illustrates the receiving operation of the selective call receiver of FIG. 2. The process of receiving a selective call message begins at step 1602. In step 1604, the address decoder searches a received signal for an address signal. Step 1606 tests any recovered address signals to determine if they correlate with at least one predetermined address associated with the selective call receiver 40. If the received address does not correlate (match), control is returned to step 1604 and a new search is performed. When a received address correlates with at least one predetermined address associated with the selective call receiver, step 1608 decodes the message header then passes control to step 1610. Step 1610 tests for the presence of a graphics data flag. If step 1610 is false, the following data block will contain symbols that will be decoded by step 1612. When decoding is complete, step 1616 stores the data and step 1618 tests for an end of message condition which may be indicated by an end-of-message marker or the lack of another data flag. If step 1618 is false (not yet at end of message) and step 1610 is true, the following data block will contain graphics and step 1614 will decode the graphics and step 1616 will store the decoded graphics. When step 1618 is true, control is returned to step 1602 and the address decoder resumes searching for valid addresses.

The decoding of a text, symbol, or graphics data block is accomplished by applying the inverse of the procedures discussed in reference to FIG. 2. To render the received FAX message, each coded section is decoded and their respective position's mapped into the presentation device's display memory. After mapping the starting rectilinear coordinates into the presentation device's display space, a means for re-assembling (the processor and message memory as shown in FIG. 2) re-assembles at least one section into a recovered document that substantially resembles the format of the original source document and the recovered document is presented. As discussed above, the message that is received and stored in memory of the selective call receiver 40 is run length encoded (RLE). The displaying of the FAX message in a RLE form by the active addressing display (i.e., not uncompressed) will be discussed below. Active addressing involves, generally, a multiplication of the image matrix with the row matrix (Walsh row signals) to obtain the column signal matrix for driving the column electrodes of the LCD. The row signals are used to calculate the column signal matrix, as discussed above, and also to drive the row electrodes of the LCD. One method of generating the column signal matrix is to generate the column matrix column-wise by multiplying each column of the image data with all rows of the row matrix. A second method of generating the column signal matrix is to generate the column matrix row-wise. This is done by multiplying each row of the image data with all columns the row matrix. A third method of generating the column signal matrix according to the preferred embodiment of the present invention is by the use of a hierarchical tree (hidden tree) structures technique. With the hierarchical tree structures technique, to be discussed in detail below, it is possible to generate the column signal matrix both row-wise or column-wise.

The WHT kernel illustrated in FIG. 5 is used to represent the signal amplitude applied to the row electrodes of the display system (electronic display) and to compute the column drive signals for driving the column electrodes of the display system. Specifically applied to FAX communication, the active addressing display enables the selective call receiver to receive and display FAX data without decompressing the compressed data. The WHT kernel has a number of unique properties that provide a method for identifying and utilizing the hierarchical tree structure by re-representing, for example, the row signals of the WHT kernel. This re-representation, to be discussed below, facilitates the hierarchical description of the WHT kernel which presents an opportunity for considerable reduction in the power consumption requirements of the calculation engines because the hierarchical description of the hidden tree technique reduces the number of calculations performed for a given display system to generate the column signal matrix as compared with the available techniques. Additional power consumption saving is realized because the FAX data is in its RLE form when it is directly correlated with the hierarchical tree structures for displaying the data thereby eliminating any data decompression step. Referring to FIG.

11, a series of hierarchical tree diagrams illustrating the re-representation of the WHT matrix in accordance with the preferred embodiment of the present invention are shown. Preferably, each row of the WHT matrix, shown in FIG. 5, is represented as a hierarchical tree structure, rows 1–8, of an 8×8 matrix. The value at each node (level) of the identified hierarchical tree structure represents the number of "ones" in a given subset of the tree, the sibling value. For example, row 1 shows the number eight (8), the sibling value, which specifies that there are eight "ones" in that row out of eight elements (for an 8×8 matrix). At this level of row 1 any further branching is meaningless because all the elements of a column of data can be determined at that level (the first level). Referring to row 2, the first level shows a sibling value of four (4) which represents four (4) "ones" out of eight elements (the codeword size). At the next lower level (sub-level) of row 2, the eight elements are divided equally among two branches, the first branch has a sibling value of four "ones" out of four elements and the other branch has a sibling value of zero "ones" out of four elements, that is also equivalent to four "minus ones" out of four elements. As shown in FIG. 5, there are an even and equal numbers of "ones" and "minus ones" in each row of the Walsh transform matrix. Further reference to row 4 shows a sibling value of four (4) "ones" out of the eight elements codeword size at the first node (first level), level 0. Continuing down the tree structure, the first branch of the second level, level 1, shows a sibling value of two (2) "ones" out of four elements. The second branch of the second level, level 1, shows a sibling value of two (2) "ones" out of the other four elements. Continuing down to the third level, level 2, the first branch at the node above is divided again, and the first branch of the third node, node 2, shows a sibling value of two (2) "ones", and the adjacent branch shows a sibling value of zero "ones". Moving across to the next branch, the first sub-branch shows a sibling value representing two "ones" and the second sub-branch shows a sibling value representing zero "ones". The "variant" is the last level of the tree, and it is the level at which further division is meaningless because all eight elements can be generated from the knowledge at that level. Accordingly, the last level, level 2, (the variant level) is read as two of the two elements are "ones", zero of two elements are "ones" (or two of two elements are "minus ones"); and two of the two elements are "ones", zero of two elements are "ones".

Additionally, the eight binary trees have been categorized into four groups 0, 1, 2, 3. Each group defines a base group. For example, group 3 has four binary tree structures each having four levels. Each tree is equivalent to each other except at the last level (the variant level). The base tree for that group is defined as having only the first three levels that are identical to each other. The last level represents one of the four possible variants. A similar representation can be given for group 2, however, group 2 has a base tree equal to the first two levels of the tree structures, e.g., two variant groups.

Therefore, by representing each rows of the WHT matrix as the hidden tree structures as described, it will be illustrated that there are redundancies inherent in the description of the WHT matrix which can be exploited to reduce the computation burden on the calculation engines thereby reducing their power consumption. Accordingly, a mathematical representation of the construction and utilization of the hidden tree structures for an arbitrary N-by-N (N×N) Sequency Ordered WHT kernel will be developed below to reduce the computational burden placed on the calculation engines by eliminating the redundancies which will reduce the power consumption. This reduction in computation burden can, on the other hand, increase computational speed for a display system with the same calculation engines because, with the WHT hierarchical tree structure method, the calculation engines perform fewer numbers of calculations for the same addressing requirement.

In this way, the selective call receivers are able to receive, process, and display FAX data because its active addressing display enables the selective call receiver to receive and display FAX data without decompressing the compressed data. The WHT kernel has a number of unique properties that provide a method for identifying and utilizing the hierarchical tree structure by re-representing the row signals of the WHT kernel. This re-representation facilitates the hierarchical description of the WHT kernel reduces the number of calculations performed for a given display system to generate the column signal matrix as compared with the available techniques. Additional power consumption saving is realized because the FAX data is in its RLE form when it is directly correlated with the hierarchical tree structures for displaying the data thereby eliminating any data decompression step.

The image data is represented as an N×N matrix, where N is an integer in accordance with the preferred embodiment of the present invention. An N×N Walsh Hadamard Transform matrix is required for the row signals' matrix. The column matrix, $G_j(\Delta t_k)$, in its most basic form can be represented as the number of matches, $D_j(\Delta t_k)$ between $J_{th}$ column of the image data matrix and the corresponding elements in the $k_{th}$ row of the WHT matrix for the address computation which is illustrated below as:

$$G_j(\Delta t_k) = (F/N) \times (2D_j(\Delta t_k) - N) \qquad (1)$$

where:

$D_j(\Delta t_k)$ are the number of matches between the $J_{th}$ column of the image data matrix and the corresponding elements in the $k_{th}$ column of the row addressing function;

$\Delta t_k$ represents the kth element in of the column matrix; and

F is a constant.

The N×N matrix results in a kernel size of:

$$2^{\lfloor \log_2 N \rfloor} \times 2^{\lfloor \log_2 N \rfloor} \qquad (2)$$

for performing the transformation, where $\log_2 N$ represents the largest integer.

In constructing and using the hierarchical tree model for the N×N transform kernel, the maximum Depth of the tree is represented as:

$$\text{Depth} = \lfloor \log_2 N \rfloor \qquad (3)$$

and the maximum number of base trees (Group) is represented as:

$$\text{Group} = 1 + \lfloor \log_2 N \rfloor = 1 + \text{Depth} \qquad (4)$$

where the Group varies within the set of $\{0 \text{ to } \log_2^N\}$.

The maximum number of levels of the tree structure is represented as the number of levels (the base tree level). The number of levels may be one of the set of $\{0, 1, \ldots, \text{Group}\}$.

The codeword size belongs to a set comprising:

$$\{2^{depth}, 2^{depth-1}, \ldots, 2^{depth-group}\}$$

and is given as:

$$\text{Codeword size(level)} = 2^{depth-level} \qquad (5)$$

According to the preferred embodiment of the present invention, the image data is preferably received column-wise, and the columns of the image data are run length encoded (RLE). The value of each codeword of the run length encoded (RLE) data determines how far down the tree (number of levels) is to be traversed based on the following rule:

for a Group within the set of {0, 1, 2, . . . , depth}, see Table 1.

Table 1 below illustrates the rule for determining the desired position (the level) within a given tree based on the RLE data.

TABLE 1

| Level Length | corresponding Run |
|---|---|
| 0 | $RLE = 2^{depth}$ |
| 1 | $2^{depth} > RLE \geq 2^{depth-1}$ |
| 2 | $2^{depth-1} > RLE \geq 2^{depth-2}$ |
| $2^{depth-2}$ 3 | |
| $2^{depth-3}$ | $2^{depth-2} > RLE \geq$ |
| . | . |
| . | . |
| Group | $2^{depth-group} \geq RLE$. |

A description of the active addressing is accomplished by applying the above equations with reference to FIGS. 12, a flow diagram illustrating the displaying in the selective call receiver having the active addressing display using the hierarchical tree structures in accordance with the preferred embodiment of the present invention. The image data being received or stored in memory of the selective call receiver is arranged in the matrix form and preferably received or retrieved in columns of the represented matrix, step 1802. As discussed above, the columns of received data are run-length-encoded (RLE) which compressed the data. The preferred RLE technique is similar to Group III FAX coding. For example, when the column of data corresponds to "+1+1+ 1–1–1+1–1–1", then the run length encoded codeword is "3212". The first number "3" corresponds to the first three "+1s", the second number "2" corresponds to the two "–1s", the third number "1" corresponds to the one "+1", and the last number "2" corresponds to the two "–1s". From this column of image data, as illustrated, four RLE codewords are derived. The first tree structure is identified, preferably from the second row of the WHT matrix, step 1806. According to the preferred embodiment of the present invention, row 2 of FIG. 11 is used because row 1 (all "ones") produces a direct current (DC) level which is undesirable. The step of identifying a given hierarchical tree structure comprises selecting a row of the WHT matrix, because according to the preferred embodiment, each hierarchical tree structure being identified is identified from each row of the WHT matrix. With the selected row, the group of the tree is determined from equation (4), and then the number of variants are determined which is shown by equation (6) given below. Both the group and the number of variant (e.g., the specific variant within the group) can be determined from the selected row of the WHT matrix. These two values (group and variant) provide all information necessary for identifying the tree. Notwithstanding the description for identifying the hierarchical tree structures, the number of levels being identified in each instance depend on the image data because different numbers of sub levels are needed depending on the image data being processed. Simultaneously with the identification of the hierarchical tree structures, the first RLE codeword of the image data is retrieved, step 1808, for example, codeword "3", and applied to the Group and variant that were determined from tree that is being identified, step 1810. The details of step 1810 will be discussed below.

As discussed in the description to FIG. 11, it was noted that each Group has at least one variant which is a function of the Group. The number of variants can be represented as:

$$Variant(group) = 2^{group-1} \qquad (6)$$

TABLE 2

| Group | Number of Variants |
|---|---|
| 1 | $2^{group-1} = 1$ |
| 2 | $2^{group-1} = 2$ |
| . | . |
| . | . |
| $log_2 N$ | $2^{log_2 N - 1}$ |

Also, the variants need not to be generated in all instances. It is necessary to generate a variant of a given group based on the following equation:

$$RLE \leq 2^{depth-group} \qquad (7)$$

In generation of the variant, the sequency ordered WHT kernel is generated as:

$$2^{Group} \times 2^{Group}$$

and the variant is given as row number:

$$2^{Group/2+Offset} \qquad (8)$$

where Offset is the given variant number in the specific base group. For example, a "1" corresponds to $2^{depth-group}$"+1s" and zero corresponds to "–1s", a "–1" is therefore represented as $2^{depth-group}$ "–1s" and zero "+1s". The preceding equations and rules provide all the necessary information for formalizing the hierarchical tree model.

Traversing down a given tree provides added resolution, and the image data dictates the required resolution which in turn dictates how far to traverse down the tree. For example, if column four of the image data has a "run" (value) of eight "+1s", then referring to row 4 of FIG. 11, for example, it is seen that by correlating the RLE data with the first level (derived from the Group and variant numbers) that it is not necessary to traverse down any levels in the tree, because the desired information can be obtained from level zero which results in four matches for that column of data. With this image data, the calculation engine would be required to do zero (0) additions while identifying only the first node of the first level of the hierarchical tree structure. Furthermore, the data could be displayed on the active addressing display of the selective call receiver without decompressing the data because the step of correlating the data with the hierarchical tree structures eliminates the decompressing step by automatically decompressing the data while processing and displaying the data.

By way of illustration, assume that column 5 of the 8×8 matrix has an image data of "1 1 1 1 0 0 0 1", then the run-length codeword is "4 3 1". With the tree identified at row 5 which has a group 3 number from equation (4) (see FIG. 11). The number of variants are determined from equation (6) to be four (4) which is also shown in FIG. 11. The number of variant for row 5 is one (i.e., the first variant in group 5). The first RLE codeword is retrieved "4" (four "+1s"), and at node (level) 0 of row 5, a determination whether to perform a correlation will be made in reference to Table 1, at level 0. The number of matches are determined by correlating the run-length codeword with the sibling value at each successive sub-level to determine when the value of the RLE codeword satisfies the equations at the corresponding levels of Table 1. Therefore, since the RLE codeword is "4", this value does not satisfy level 0 of Table 1, because it is not equal to eight so no correlation is performed at level 0. It is therefore necessary to traverse one level down the tree, and at level 1, the RLE "4" satisfies the equation at level 1 of Table 1. Specifically, $_2{}^{depth} > RLE \geq _2{}^{depth-1}$ at level 1 equates to $(8 > 4 \geq 4)$. Since the condition is satisfied at level 1, level 1 is generated and a correlation is performed with the sibling values (values) at level 1 with the RLE codeword. The sibling values (values) are generated from the knowledge of the properties of the WHT matrix and the level number of the hierarchical tree structure. As was discussed, each row of the WHT matrix has its particular row value, and at each sub-level, the row valves are divided equally to generate the sibling values. By correlating the codeword of the image data with the sibling value at level 1, the numbers of matches are determined to be two (two "+1s") at level 1 for the first codeword "4". The next codeword "3" (three "−1s") is then selected. In proceeding to determine the number of matches, it is to be noted that the position in the tree is not memoryless. It is a function of the past as well as the current run length codeword. All past runs for a given column of image data will determine the next position in the tree for the current run length codeword. This is easily understood because for each column, for example, the run length encoded image data can produce more than one run-length-encoded codeword. Therefore, each subsequent RLE codeword being processed is affected by the position of the previous codeword in the column of image data.

Therefore, with the second RLE "3", it is necessary to shift to the next branch (the next sibling value) at the same level, level 1, of the tree (row 5). The RLE of "3" does not satisfy the equation in Table 1 at level 1 so no correlation is performed at this level. Accordingly, it is necessary to traverse down the tree as shown by the broken arrow. At level 2, referring to Table 1 at level 2, the RLE "3" satisfies the equation at level 2 because three is between four and two as required by the equation at level 2. This sub-level is generated and the sibling values are implicit. The numbers of matches are then determined by the step of correlating which correlates the sibling value with the RLE codeword resulting in one match (one "−1"). At this juncture, there is a total of three matches (two "+1s" and one "−1"). A remainder of one (one "−1") is left from the second RLE codeword because only two of the three values were used to obtain the single match. At level 2, the remainder "1" does not satisfy the equation of Table 1, level 2 so no correlation is performed at this level. It is therefore necessary to traverse down to level 3 as shown by the broken line in FIG. 11, row 5. At level 3, the equation in Table 1, level 3 is satisfied, and this sub-level is generated and sibling values are determined. A correlation is performed with the remainder one ("−1) and the first sibling value at level 3 produces a match. At this point, there are a total of four matches. The next RLE codeword "1" is selected. Therefore, since level 3 of row 5 is the variant level, then by moving to the next branch (the next sibling value), a match is obtained which completes the processing for that column of image codeword. According to this illustration, three additions were performed, as opposed to eight that would have been performed by the conventional methods, and five matches were found, two "+1", two "−1", and one "+1". Additionally, the RLE codeword was directly applied to the hierarchical tree structure without decompressing the data which was RLE.

Therefore, with the hierarchical tree structure method of performing the computation by the selective call receiver, a significant reduction in power consumption is achieved. Furthermore, by combining the selective call receiver having an active addressing display with FAX communication, the active addressing display in the selective call receiver eliminates the need for decompressing the data (message) before displaying. As discussed, the message to be FAXed was encoded in Group III format which is a RLE compression code. With the hierarchical tree structure representation of the data to be displayed, the step of decompressing the data is eliminated because the data when correlated with the hierarchical tree structures can be displayed on the active addressing display without decompressing the data.

Still referring to FIG. 12, at step 1812, a determination is made to check if the last RLE codeword was processed. If not, the next RLE codeword is retrieved, step 1814, and the RLE codeword is applied to the retrieved row of the WHT matrix as described above in step 1810. However, if the last RLE codeword was processed, then step 1816 checks to determine when the last row of the WHT matrix was received. If the last row was not received, the next row is received, step 1818, and the process continues to step 1808 which retrieves the first RLE codeword. However, when the last row of the WHT matrix was processed, step 1816, step 1820 determines if the last column of image data was processed. If no, the process continues to step 1802. However, when the last column was received, the flow continues to block 1822 where more data is received and the process can repeat itself. According to the preferred method of the present invention, the hierarchical tree structure is being identified as required to correlate each codeword of the image data with the sibling values which eliminates the need to store the hierarchical tree structure or to decompress the data being displayed on the active addressing display.

Thus, the preferred embodiment of the present invention provides a method and apparatus for driving an active addressing display in a manner that advantageously minimizes the power consumption of the required calculation engine. By performing calculations using the hidden tree hierarchical method, the preferred embodiment of the present invention substantially reduces the number of calculations and thus substantially reduces the power required to perform active addressing in a portable device. The reduced power compared to conventional drivers for active addressing display is a particularly important advantage in portable, battery-powered applications, such as laptop computers, in which long battery life is a highly desirable feature. Furthermore, by combining the selective call receiver having an active addressing display with FAX communication, the active addressing display in the selective call receiver eliminates the need for decompressing the data (message) before displaying. As discussed, the message to be FAXed was encoded in Group III format which is a RLE compression code. However with the hierarchical tree structure representation of the data to be displayed, the step of decompressing the data is eliminated because the data when correlated with the hierarchical tree structures can be displayed on the active addressing display without decompressing the data.

In summary, a processing system for addressing an electronic display comprises picture elements (pixels) controlled by a plurality of first and second electrodes. The plurality of first electrodes are controlled by a plurality of periodic first drive signals which have a predetermined number of time slots independent of data being displayed. The plurality of second electrodes are controlled by a plurality of second drive signals responsive of the data being displayed. The processing system comprises a calculating engine for calculating, from data being received, the plurality of second drive signals for one of the plurality of second electrodes for a time slot of the predetermined number of time slots. The calculating engine also calculates one of the plurality of drive signals, for the one of the plurality of second electrodes, as a function of the plurality of periodic first drive signals for the time slot and a selected plurality of pixel values for pixels collectively controlled by the one of the plurality of second electrodes. The calculating engine comprises means for representing the plurality of periodic first drive signals as a sequency ordered Walsh Hadamard Transform (WHT) matrix having a number of rows corresponding to the plurality of first electrodes and a number of columns corresponding to the predetermined number of time slots. The calculating engine also comprises means, coupled to the representing means, for identifying a plurality of hierarchical tree structures corresponding to the rows of the WHT matrix representation of the plurality of periodic first drive signals. The identifying means comprises means for assigning values at each node of the hierarchical tree structures of the WHT matrix in response to amplitudes of the plurality of first drive signals corresponding to the one of the predetermined number of time slots; means for generating sub-levels from a first level wherein the means for assigning, in response to the means for generating, assigns values being derived from the values at the first level for the sub-levels being generated; and means, in response to the means for assigning, for correlating the values of the nodes of the hierarchical tree structures with the data. A controller, coupled to the calculating engine, controls a selection of other pluralities of pixel values for pixels collectively controlled by other corresponding ones of the plurality of second electrodes for calculating additional ones of the plurality of second drive signals for the time slot until the second drive signals for the time slot have been calculated for substantially all pixel values of first frame of data. An encoder, coupled to the calculating engines, encodes the data for a processor which processes the data being encoded and the hierarchical tree structures being identified within the WHT matrix for addressing of the pixels of the electronic display.

In summary, the preferred embodiment of the present invention is a selective call signaling system capable of facsimile communication with at least one selective call receiver having an active addressing display comprising picture elements (pixels) controlled by a plurality of first and second electrodes. The selective call signaling system comprises means for compressing data forming compressed data; and a transmitter for transmitting the compressed data organized in frames to the at least one selective call receiver. The selective call receiver comprises a receiver for receiving the compressed data; and an active addressing display for displaying the compressed data. The active addressing display comprises a controller for controlling the plurality first electrodes by a plurality of periodic first drive signals represented as a sequency ordered Walsh Hadamard transform (WHT) matrix and the plurality of second electrodes by a plurality of second drive signals responsive to the compressed data being displayed. A processor comprises means for calculating the plurality of second drive signals directly from the compressed data; means for driving the plurality of second electrodes with the one of the plurality of second drive signals calculated by the processor while said means for driving concurrently drives the plurality of first electrodes; and means for identifying a plurality of hierarchical tree structures corresponding to rows of the WHT matrix for processing the frames of compressed data directly with hierarchical tree structures. The means for identifying further comprises means for determining and correlating values of the hierarchical tree structures with the compressed data; and means, coupled to the means for determining, for generating sub-levels from a value being determined at a first level of the hierarchical tree structures.

What is claimed is:

1. In a selective call signaling system capable of communicating with at least one selective call receiver having an active addressing display comprising picture elements (pixels) controlled by a plurality of first and second electrodes, a method for facsimile communication, comprising the steps of:

(a) compressing data forming compressed data;

(b) transmitting the compressed data organized in frames to the at least one selective call receiver;

(c) the at least one selective call receiver receiving the compressed data;

(d) displaying the compressed data on the active addressing display of the at least one selective call receiver; said step of displaying comprising the steps of:

(e) controlling the plurality first electrodes by a plurality of periodic first drive signals represented as a sequency ordered Walsh Hadamard transform (WHT) matrix and the plurality of second electrodes by a plurality of second drive signals responsive of the compressed data; and (f) calculating the plurality of second drive signals from the compressed data wherein the step of calculating further comprises a step of identifying a plurality of hierarchical tree structures corresponding to the WHT matrix; and (g) processing the compressed data with hierarchical tree structures identified in the WHT matrix for reducing power consumption by reducing a number of computations in the Step (f) of calculating the plurality of second drive signals.

2. The method according to claim 1 wherein step (d) further comprises the step of:

(h) driving the plurality of second electrodes with the one of the plurality of second drive signals calculated while concurrently driving the plurality of first electrodes with the plurality of periodic first drive signals.

3. The method according to claim 2 further comprising the step of:

(i) repeating steps (f) through (h) using other selected pluralities of pixels for calculating additional ones of the plurality of second drive signals until the second drive signals have been calculated for substantially all pixels of the compressed data.

4. The method according to claim 1 wherein the step of identifying identifies the hierarchical tree structures in the WHT matrix corresponding to rows of the WHT matrix.

5. The method according to claim 1 wherein the step of identifying further comprises a step of determining for determining values at nodes of the hierarchical tree structures of the WHT matrix in response to amplitudes of the plurality of first drive signals.

6. The method according to claim 5 wherein the step of identifying comprises the steps of:

correlating the hierarchical tree structures with the compressed data; and generating a first level and sub-levels therefrom wherein said step of determining, in response to the step of generating, determines values being derived from the value at the first level for the sub-levels being generated.

7. The method according to claim 1 wherein the step of compressing the data comprises a group III facsimile data compression code.

8. In a selective call receiver having an active addressing display comprising picture elements (pixels) controlled by a plurality of first and second electrodes, a method for facsimile communication, comprising the steps of:

(a) receiving data transmitted in frames and being compressed forming compressed data; and (b) displaying the compressed data on the active addressing display; said step of displaying comprising the steps of:

(c) controlling the plurality first electrodes by a plurality of periodic first drive signals represented as a sequency ordered Walsh Hadamard transform (WHT) matrix and the plurality of second electrodes by a plurality of second drive signals responsive of the compressed data;

(d) calculating the plurality of second drive signals from the compressed data wherein the step of calculating further comprises a step of identifying a plurality of hierarchical tree structures corresponding to the WHT matrix; and (e) processing the frames of compressed data with hierarchical tree structures identified in the WHT matrix for reducing power consumption by reducing a number of computations in the step (d) of calculating the plurality of second drive signals.

9. The method according to claim 8 wherein step (b) further comprises the step of:

(f) driving the plurality of second electrodes with the one of the plurality of second drive signals being calculated while concurrently driving the plurality of first electrodes with the plurality of periodic first drive signals.

10. The method according to claim 9 further comprising the step of:

(g) repeating step (d) through (f) using other selected pluralities of pixels for calculating additional ones of the plurality of second drive signals until the second drive signals have been calculated for substantially all pixels of the frame of compressed data.

11. The method according to claim 8 wherein the step of identifying identifies the hierarchical tree structures corresponding to rows of the WHT matrix.

12. The method according to claim 8 wherein the step of identifying further comprises a step of determining for determining values at nodes of the hierarchical tree structures of the WHT matrix in response to amplitudes of the plurality of first drive signals.

13. The method according to claim 12 wherein the step of identifying comprises the steps of:

correlating the hierarchical tree structures with the compressed data; and generating a first level and sub-levels therefrom wherein said step of determining, in response to the step of generating, determines values being derived from the value at the first level for the sub-levels being generated.

14. The method according to claim 8 wherein the step of compressing the data comprises a group III facsimile data compression code.

15. A selective call signaling system capable of facsimile communication with at least one selective call receiver having an active addressing display comprising picture elements (pixels) controlled by a plurality of first and second electrodes, the at least one selective call signaling system comprising:

means for compressing data forming compressed data;

a transmitter for transmitting the compressed data organized in frames to the at least one selective call receiver, the selective call receiver, comprising:

a receiver for receiving the compressed data;

an active addressing display for displaying the compressed data, the active addressing display, comprising:

a controller for controlling the plurality first electrodes by a plurality of periodic first drive signals represented as a sequency ordered Walsh Hadamard transform (WHT) matrix and the plurality of second electrodes by a plurality of second drive signals responsive to the compressed data being displayed; and a processor comprising means for calculating the plurality of second drive signals from the compressed data and means for identifying a plurality of hierarchical tree structures corresponding to the WHT matrix, the processor processes the frames of compressed data with hierarchical tree structures identified in the WHT matrix for reducing power consumption by reducing a number of computations for calculating the plurality of second drive signals.

16. The selective call signaling system according to claim 15 wherein the active addressing display further comprises:

means for driving the plurality of second electrodes with the one of the plurality of second drive signals being calculated while said means for driving concurrently drives the plurality of first electrodes.

17. The selective call signaling system according to claim 15 wherein the means for identifying identifies the hierarchical tree structures corresponding to the rows of the Walsh Hadamard Transform matrix, said means for identifying further comprising:

means for determining and correlating values of the hierarchical tree structures with the compressed data; and means, coupled to the means for determining, for generating sublevels from the value being determined at a first level of the hierarchical tree structures.

18. A selective call receiver having an active addressing display comprising picture elements (pixels) controlled by a plurality of first and second electrodes, the selective call receiver comprising:

a receiver for receiving compressed data;

an active addressing display for displaying the compressed data, the active addressing display, comprising:

a controller for controlling the plurality first electrodes by a plurality of periodic first drive signals represented as a sequency ordered Walsh Hadamard transform (WHT) matrix and the plurality of second electrodes by a plurality of second drive signals responsive of the compressed data being displayed; and a processor comprising means for calculating the plurality of second drive signals from the compressed data and means for identifying a plurality of hierarchical tree structures corresponding to the WHT matrix, the processor processes the frames of compressed data with hierarchical tree structures identified in the WHT matrix for reducing power consumption by reducing a number of computations for calculating the plurality of second drive signals.

19. The selective call receiver according to claim 18 wherein the active addressing display further comprises:

means for driving the plurality of second electrodes with the one of the plurality of second drive signals being calculated while said means for driving concurrently drives the plurality of first electrodes.

20. The selective call receiver according to claim 18 wherein the means for identifying identifies the hierarchical tree structures in the WHT matrix corresponding to rows of the Walsh Hadamard Transform matrix, said means for identifying further comprising:

means for determining and correlating values of the hierarchical tree structures with the compressed data; and means, coupled to the means for determining, for generating sub-levels from a value being determined at a first level of the hierarchical tree structures.

21. A selective call signaling system capable of facsimile communication with at least one selective call receiver having an active addressing display comprising picture elements (pixels) controlled by a plurality of first and second electrodes, the selective call signaling system comprising:

means for compressing data forming compressed data;

a transmitter for transmitting the compressed data organized in frames to the at least one selective call receiver, the selective call receiver, comprising:

a receiver for receiving the compressed data;

an active addressing display for displaying the compressed data, the active addressing display, comprising:

a controller for controlling the plurality first electrodes by a plurality of periodic first drive signals represented as a sequency ordered Walsh Hadamard transform (WHT) matrix and the plurality of second electrodes by a plurality of second drive signals responsive to the compressed data being displayed;

a processor comprising means for calculating the plurality of second drive signals from the compressed data;

means for driving the plurality of second electrodes with the one of the plurality of second drive signals calculated by the processor while said means for driving concurrently drives the plurality of first electrodes; and means for identifying a plurality of hierarchical tree structures corresponding to rows of the WHT matrix for processing the frames of compressed data with hierarchical tree structures identified in the WHT matrix, said means for identifying further comprising:

means for determining and correlating values of the hierarchical tree structures identified in the WHT matrix with the compressed data for reducing power consumption by reducing a number of computations: and means, coupled to the means for determining, for generating sub-levels from a value being determined at a first level of the hierarchical tree structures.

* * * * *